(12) United States Patent
Marchiori et al.

(10) Patent No.: US 11,269,953 B2
(45) Date of Patent: *Mar. 8, 2022

(54) SERVER-BASED CONVERSION OF AUTOPLAY CONTENT TO CLICK-TO-PLAY CONTENT

(71) Applicant: Google LLC, Mountain View, CA (US)

(72) Inventors: Eugenio Jorge Marchiori, London (GB); Michael Francis Warriner, Warwickshire (GB)

(73) Assignee: Google LLC, Mountain View, CA (US)

(*) Notice: Subject to any disclaimer, the term of this patent is extended or adjusted under 35 U.S.C. 154(b) by 265 days.

This patent is subject to a terminal disclaimer.

(21) Appl. No.: 16/375,374

(22) Filed: Apr. 4, 2019

(65) Prior Publication Data

US 2019/0286653 A1 Sep. 19, 2019

Related U.S. Application Data

(63) Continuation of application No. 15/180,749, filed on Jun. 13, 2016, now Pat. No. 10,289,732.

(51) Int. Cl.
*G06F 16/783* (2019.01)
*G06F 16/951* (2019.01)
(Continued)

(52) U.S. Cl.
CPC ...... *G06F 16/7837* (2019.01); *G06F 3/04817* (2013.01); *G06F 3/04842* (2013.01);
(Continued)

(58) Field of Classification Search
CPC ............. G06F 16/7837; G06F 16/4393; G06F 16/9574; G06F 16/739; G06F 16/951; G06F 3/04817; G06F 3/04842
See application file for complete search history.

(56) References Cited

U.S. PATENT DOCUMENTS 8,122,004 B2 2/2012 Hedge et al.
8,543,919 B1 9/2013 Amzallag et al.
(Continued)

FOREIGN PATENT DOCUMENTS

CN 101635826 1/2010
CN 102804179 11/2012
(Continued)

OTHER PUBLICATIONS

KR Office Action in Korean Application No. 10-2018-7031365, dated Apr. 17, 2020, 8 pages (with English translation).
(Continued)

*Primary Examiner* — Kris E Mackes
*Assistant Examiner* — Lin Lin M Htay
(74) *Attorney, Agent, or Firm* — Fish & Richardson P.C.

(57) ABSTRACT

Methods, systems, and apparatus, including computer programs encoded on a computer storage medium, for generating and providing converted content. In one aspect, a system includes a content database that receives content from content providers and stores original content comprising animating content and converted content associated with the original content; a converter system that: receives the original content from the content database; generates the converted content, comprising: for a particular original content, identifying and extracting, from the particular original content, a static representation; overlaying the static representation with UI elements; and storing a particular converted content that comprises the static representation overlaid with the UI elements; and transmits the converted content to the content database; a content distribution system that: receives a request for content; identifies a first original content from the content database; receives a first converted content associated with the first original content; and provides the first converted content.

20 Claims, 7 Drawing Sheets

(51) Int. Cl.
    *G06F 16/738*     (2019.01)
    *G06F 16/438*     (2019.01)
    *G06F 16/957*     (2019.01)
    *G06F 3/0481*     (2013.01)
    *G06F 3/0484*     (2013.01)
    *G06F 3/04817*     (2022.01)
    *G06F 3/04842*     (2022.01)

(52) U.S. Cl.
    CPC ........ *G06F 16/4393* (2019.01); *G06F 16/739* (2019.01); *G06F 16/951* (2019.01); *G06F 16/9574* (2019.01)

(56) References Cited

U.S. PATENT DOCUMENTS

| | | | |
|---|---|---|---|
| 2003/0046348 A1 | 3/2003 | Pinto et al. | |
| 2003/0093790 A1* | 5/2003 | Logan | G11B 27/34 725/38 |
| 2005/0251491 A1 | 11/2005 | Medina | |
| 2006/0026162 A1* | 2/2006 | Salmonsen | G06F 16/44 |
| 2006/0161635 A1* | 7/2006 | Lamkin | G06F 16/4387 709/217 |
| 2008/0034306 A1 | 2/2008 | Ording | |
| 2008/0195698 A1* | 8/2008 | Stefanovic | H04N 21/234309 709/203 |
| 2009/0006375 A1* | 1/2009 | Lax | G06Q 30/02 |
| 2010/0281042 A1 | 11/2010 | Windes et al. | |
| 2011/0289139 A1 | 11/2011 | McIntosh | |
| 2014/0365683 A1 | 12/2014 | Bergman et al. | |
| 2015/0012363 A1* | 1/2015 | Grant | G06Q 30/0269 705/14.66 |
| 2015/0095782 A1 | 4/2015 | Avedissian et al. | |
| 2015/0134624 A1* | 5/2015 | Dwan | G06F 16/162 707/692 |
| 2015/0193409 A1 | 7/2015 | Portnoy et al. | |
| 2018/0329685 A1 | 11/2018 | Vasilyev | |

FOREIGN PATENT DOCUMENTS

| | | |
|---|---|---|
| CN | 103279882 | 9/2013 |
| CN | 104137553 | 11/2014 |
| CN | 105874451 | 8/2016 |
| EP | 2034487 | 3/2009 |

OTHER PUBLICATIONS

KR Office Action in Korean Application No. 10-2018-7031365, dated Aug. 12, 2020, 8 pages (with English translation).

JP Notice of Allowance in Japanese Application No. 2018-559741, dated Feb. 12, 2020, 5 pages (with English translation).

International Search Report and Written Opinion in International Application No. PCT/US2016/065748, dated Mar. 3, 2017, 12 pages.

CN Office Action in Chinese Appln. No. 201680085675.8, dated May 25, 2021, 9 pages (with English translation).

Cui et al.. "Analysis on the communication characteristics of video advertisements on video sharing website—taking Youku as an example," China's New Technology and New Products, Oct. 2011, 1 page.

Office Action in Chinese Appln. No. 201680085675.8, dated Jul. 30, 2021, 7 pages (with English translation).

\* cited by examiner

SERVER-BASED CONVERSION OF AUTOPLAY CONTENT TO CLICK-TO-PLAY CONTENT

CROSS-REFERENCE TO RELATED APPLICATION

This application is a continuation application of U.S. application Ser. No. 15/180,749, filed Jun. 13, 2016, which is incorporated by reference.

BACKGROUND

This specification relates to data processing and content conversion.

The Internet provides access to a wide variety of resources. For example, video and/or audio files, as well as web pages for particular subjects or particular news articles are accessible over the Internet Content can be presented in various forms: image content, Flash® content, video content, and HTML content. Flash® content, video content, and HTML content are often presented as autoplay content that begin animating without user interaction.

SUMMARY

In general, one innovative aspect of the subject matter described in this specification can be embodied in a system comprising: a content database, in communication with one or more content providers, that receives content from the one or more content providers and stores a plurality of original content items comprising animating content and a plurality of converted content items associated with the plurality of original content items; a converter system, including one or more processors, in communication with the content database that: receives the plurality of original content items from the content database; generates the plurality of converted content items from the plurality of original content items, comprising: for a particular original content item, identifying, from the particular original content item, a relevant static representation; extracting, from the particular original content item, the relevant static representation; overlaying the relevant static representation with one or more user interface elements associated with playback of the particular original content item; and storing a particular converted content item that comprises the relevant static representation overlaid with the one or more user interface elements; and transmits the plurality of converted content items to the content database; a content distribution system, including one or more processors, in communication with the content database, that: receives, from a remote client device, a request for content; in response to the request for content, identifies a first original content item from the plurality of original content items stored on the content database; receives, from the content database, a first converted content item associated with the first original content item; and provides, to the remote client device, the first converted content item associated with the first original content item. Other embodiments of this aspect include corresponding methods, apparatus, and computer programs, configured to perform the actions of the methods, encoded on computer storage devices.

These and other embodiments can each optionally include one or more of the following features. The content distribution system may further receive, from the remote client device, a user request to view animated content related to the first converted content item; and in response to receiving the user request to view animated content, provide, to the remote client device, the first original content item. The plurality of original content items may further comprise autoplay HTML content and the plurality of converted content items comprise click-to-play content. The converter system may further analyzes original content items in the content database and identifies original content items that are eligible for conversion. Identifying original content items that are eligible for conversion may comprise identifying original content items that are larger than a threshold file size. Overlaying the relevant static representation with one or more user interface elements may comprise identifying a template that defines the one or more user interface elements and relative positions of the one or more interface elements. The template may further define at least one of a level of grayscale or level of opacity. The one or more user interface elements may include at least one of a play button and a button associated with accessing a web page of a content provider that provided the original content. The converted content may have a smaller file size than the original content.

In some implementations, the content distribution system receives the request for content and provides the converted content to one of a web browser or native application on the client device. In some implementations, the content database stores each of the plurality of converted content items in association with a corresponding original content item. The plurality of converted content items may comprise substantially static content. The request for content from the remote client device may include a request for animating content.

In some implementations, the content distribution system further determines, after identifying the first original content item, whether to provide to the remote client device the first original content item or the first converted content item. In some implementations, determining whether to provide to the remote client device the first original content item or the first converted content item comprises: determining a file size of the first original content item and a file size of the first converted content item; and based on a comparison of the file size of the first original content item and the file size of the first converted content item with a threshold file size, selecting the first converted content item.

Methods can further include the actions of receiving, by content database and from one or more content providers, a plurality of original content items comprising animating content; generating, by one or more processors, a plurality of converted content items from the plurality of original content items, the generating comprising: for a particular original content item, identifying, from the particular original content item, a relevant static representation; extracting, from the particular original content item, the relevant static representation; overlaying the relevant static representation with one or more user interface elements associated with playback of the particular original content item; and storing a particular converted content item that comprises the relevant static representation overlaid with the one or more user interface elements; and storing, by the content database, each of the plurality of converted content items in association with a corresponding original content item; receiving, from a remote client, a request for content; in response to the request for content, identifying a first original content item from the plurality of original content items stored on the content database; receiving, from the content database, a first converted content item associated with the first original content item; and providing, to the remote client device, the first converted content item associated with the first original content item.

In some implementations further include the actions of receiving, from the remote client device, a user request to view animated content related to the first converted content item; and in response to receiving the user request to view animated content, providing, to the remote client device, the first original content item. In some implementations, the plurality of original content items comprise autoplay HTML content and the plurality of converted content items comprise click-to-play content. In some implementations, the methods can further include the actions of determining, after identifying the first original content item, whether to provide to the remote client device the first original content item or the first converted content item, comprising: determining a file size of the first original content item and a file size of the first converted content item; and based on a comparison of the file size of the first original content item and the file size of the first converted content item with a threshold file size, selecting the first converted content item.

As used herein, autoplay content refers to animated content that begins animating automatically and without user interaction after loading. Examples of autoplay content include Flash® content, video content, HTML content, and other animating content. Autoplay content can be converted into click-to-play content. Click-to-play content refers to content that has been turned static or paused automatically and requires a click or other input to be played or animated.

Particular implementations of the subject matter described in this specification can be implemented so as to realize one or more of the following advantages. By converting dynamic content to initially static content, or mostly static content (e.g., converting an autoplay content item to a click-to-play content item), the technology provides reduced content delivery latency because content is presented to a client device in a lightweight form (i.e., a reduced amount of data relative to an original amount of data, such as images rather than video) until a user clicks to cause the content to become animated. Because the content is presented in a lightweight form, the device is required to load fewer bytes, images load faster, and browsers require less time to render the content. The lightweight form of the content further results in a less battery usage by a device because the lightweight content is not played back, thereby reducing the processing resources used by the device, and the device is only required to initially render images and static HTML rather than full motion video. Static content does not introduce work in every animation frame, reducing the overall load on a user's device and improving web experience (e.g., scrolling). The converted content still resembles original autoplay content and can be caused to animate if the user wishes to view the animation, so the content presentation maintains the full user experience that the content provider intended for viewers just behind "one click" (e.g., the user clicking on a play button to cause the content to animate). The approach further allows content distribution systems to maintain control of the user experience by selecting which content to present, how it is presented and when it should be presented to client devices.

Additionally, the technology provides an improved user experience by performing content conversion on the server rather than on the browser, avoiding placing an unnecessary load on and using resources of the client device. The technology further provides an improved user experience in that the user can control how much of the content that he or she wishes to view and therefore how much content is downloaded to the client device from the server. The user is also presented with sufficient content so that he or she can make a decision regarding whether he or she wishes to view more of the content and can interact with the content in a user-friendly manner. For example, the user may see a still image, and based on viewing that still image he or she may indicate that he or she wishes to view the entire animating content. Alternately, the user may see the still image and decide that he or she wishes to view a website associated with the content without viewing the animation and click directly on a button to navigate to the website. This provides an improved user-friendly interface for the user to interact with the content. In particular, this is an improvement over browser-side implementations that require a user to click on content at least twice on content—first to start playback and then to navigate to another page—in order to arrive at a landing page associated with the content.

The technology provides another improved user experience over scenarios where animation is downloaded and stopped immediately or early on during playback. In those instances, the resulting static content after the animation is stopped may not be representative of the entire content. The technology described herein presents a method of providing a more representative display of the full content.

In some implementations, part of an autoplay content item may be provided to the client device at the same time that the click-to-play content is provided. Then if a user indicates a desire to view animation associated with the click-to-play content, some data from the autoplay content has already been downloaded to the client device so the time required to download the remaining autoplay content is decreased and the corresponding lag in presenting the video content experienced by the client device is similarly decreased.

Moreover, the bandwidth of a communications network (e.g., a local area network, wide area network, wireless network, and/or the Internet) that connects the remote client device to a content distribution system may be conserved by reducing the amount of data that the network carries to user devices. For instance, if a user is presented with click-to-play content but never indicates a desire to view the animation, the network is not burdened by having to carry the additional data associated with the autoplay content. In some cases, this can be especially significant for wireless and cellular data networks in which the amount of bandwidth consumed by individual users is closely regulated so as to ensure that, on average, the capacity of the network is not overwhelmed by the activities of a population of users. Streaming video and other animated content requires a relatively large amount of bandwidth (e.g., as compared to text, still images, or some other content types), and so reducing the amount of content transmitted on the network can have a significant impact on network performance.

In some implementations, the techniques described herein generating click-to-play content from autoplay content can also improve aspects of users' computing devices. Downloading, streaming, and playing video or other animating content on client devices are generally computationally expensive activities. Some of this expense may be reduced by avoiding downloading, streaming, and/or playing video or animating content that users are not interested in viewing. Moreover, in the context of mobile devices and other battery-powered computing devices, saving computational expense may not wish to view can conserve power and reduce battery drain on the device, thereby extending the device's battery life.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
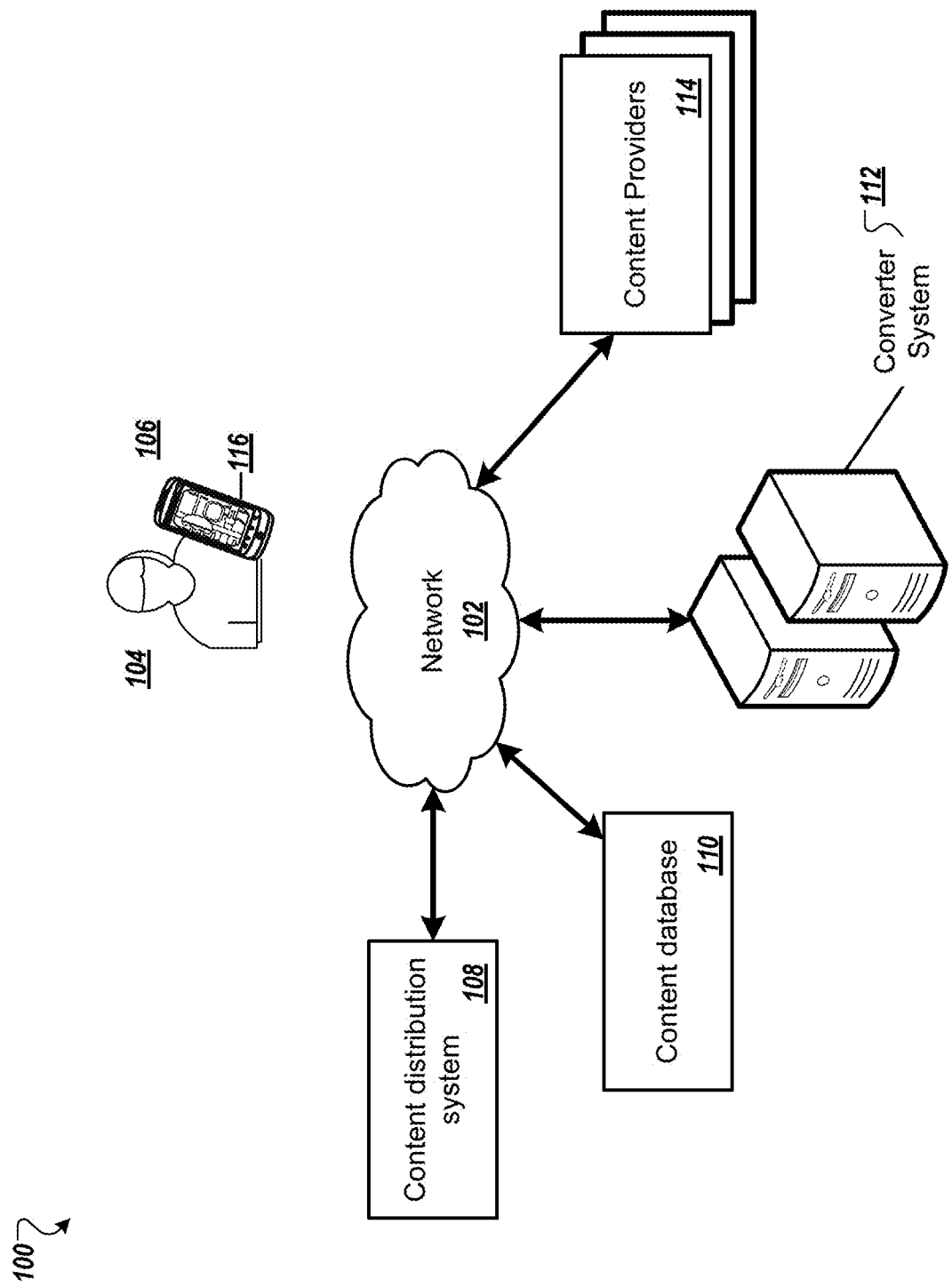
FIG. 1 is a block diagram of an example environment in which a content distribution system manages conversion and distribution of content items.

HTML autoplay content automatically loads on publisher websites, causing resources to be downloaded, code to be executed, and other user-visible effects (e.g., CSS animation). While this HTML autoplay content providers a richer user experience (e.g., relative to that provided by static content), it can also cause negative effects. First, the content may be overly distracting and can leave a user with a bad impression of a content provider associated with the content or a content publisher presenting the content. Next, the content can slow down the browsing experience and affect the battery life of the user's device (e.g., by utilizing more of the user device processing power). The autoplay content may also affect other content that is displayed on the same website or application. Finally, the content can also take a long time to load, showing a blank filler to the user while the content is loading.

With the rise of browser-based content blockers (e.g., ad blockers), there is a tendency by browsers to try to stop various forms of content on the Internet from loading automatically or from being requested at all. While some browser-based content blockers may prevent autoplay content from playing automatically, these browser-based content blockers still require that the computing device first download all of the content (e.g., animating content, Flash® content)—typically including large amounts of data—before preventing the content from autoplaying. That is, these browser-based content blockers generally require that the client device first download the entire animated content before blocking the automatic playback of the animated content. In some instances, the browser displays some of the animated content before stopping playback. Either way, the client device downloads the entire content even if the user only views a single image from the content. This browser-based approach therefore uses client resources in order to stop autoplay content.

Other content blockers block content before the content request is even made. These content blockers, however, may block content that the user may wish to see without giving the user an option of viewing any part of the content.

This application discusses server-based content converters. These server-based content converters identify autoplay content, or other content having animation, at the server and convert the autoplay content into click-to-play content at the server before the content is ever received at a browser on a client device. For this approach, essentially, a content server may only serve as much content as the viewer requests to see. For example, rather than serving HTML autoplay content, the content server provides only static content with user interface elements that allow the user to indicate that he or she wishes to view animation of HTML autoplay content (e.g., by interacting with a play button displayed with the static content). If the user clicks on a play button, then this is an indication that the user wishes to view the animation, and the content server provides the HTML autoplay content. This solution is achieved by converting the original content (e.g., HTML autoplay content) on the server side rather than the browser side.

Converting content at the server, prior to the browser receiving the content, provides various advantages. First, it is easier for a server to determine a type of content (e.g., animating or non-animating content) than it is for a browser. This is true primarily because a client device can generally only determine a type of content after all of the content is loaded into the document object model, thereby introducing latency and other problems associated with lag. Consequently, browsers implementing ad blockers, for example, often block both types of content. Next, a server can distinguish between content that can be loaded quickly versus content that will take up a lot of resources to load. The server can distinguish between types of content, for example, by offline ejection in an experimental setting or heuristic analysis of the content (e.g., an amount of Javascript® in the content) or of data collected from previous runs. Additionally, a server performing the content conversion can provide various click-through options. For example, if a user indicated that he wished to visit a content provider's website without viewing the animation associated with the content, he or she could do so by clicking directing on a user interface element that would direct the user to the content provider's website rather than first having to click on a play button and view the animation.

The autoplay content may be presented in the form of HTML content. The server may convert this content into pure static content (e.g., a still image) or very simple HTML content that only represents static portions of the autoplay content (e.g., a still image with user interface elements). The converted content may, in some implementations, comprise a snipped of animated content. With purely static—or mostly purely static—content, the user's device will load the content more quickly than the amount of time it will take to load the animated content because the file size of the static content will generally be smaller than that of the animated content (e.g., with only limited JS scripts being loaded). With the simple HTML content, the user can view a still image extracted from the autoplay content, but the user can also interact with the content via the user interface elements in order to view the animation. Presentation of only simple HTML content would result in the content loading quickly on a user's computing device while presenting high quality content for a positive user experience.

FIG. 1 is a schematic diagram of an example environment 100 for converting HTML autoplay content to click-to-play content and serving each of these contents. In some implementations, the example environment generates the clickto-play content by extracting a relevant still image from the autoplay content and overlays the extracted still image with one or more user interface (UI) elements that can be used to start playback of the autoplay content.

The example environment 100 includes a data communication network 102, such as a local area network (LAN), a wide area network (WAN), the Internet, or a combination thereof. The network 102 enables data communication between multiple electronic devices and systems. In particular, the network 102 connects a user 104 and a client device 106, content distribution system 108, content database 110, converter system 112, and a plurality of content providers 114. Communications links of the network can be wireline or wireless links or both. Client device 106 is an electronic device that is under control of a user and is capable of requesting and receiving resources over the network 102. Example client devices 106 include laptop computers, desktop computers, television devices that are enabled to stream online video content, mobile communication devices (e.g., smart phones, tablet computing devices, netbooks, notebook computers, or wearable devices), and other devices that can send and receive data over the network 102.

A client device 106 typically includes a user application, such as a web browser that can display a publisher website 116, or native application (e.g., a video game, news application, messaging application) (not shown) to facilitate the sending and receiving of data over the network 102. The content distribution system 108, content database 110, and converter system 112 may include laptops, desktops, workstations, personal digital assistants, servers, blade servers, mainframes, and other appropriate computers. Servers may generally comprise a collection of one or more computers and may perform processing across the one or more computers in one or more geographically separated locations.

In many cases, content providers 114 may include parties that organically created their own animating content to share with others, but content providers 114 may also refer to parties who upload content that was actually created by one or more other parties but which the first party wishes to share. The content providers 114 may upload original animating content to the content database 110. The content database 110 is generally responsible for storing, maintaining, and indexing content that has been made available for distribution.

Figure 7:
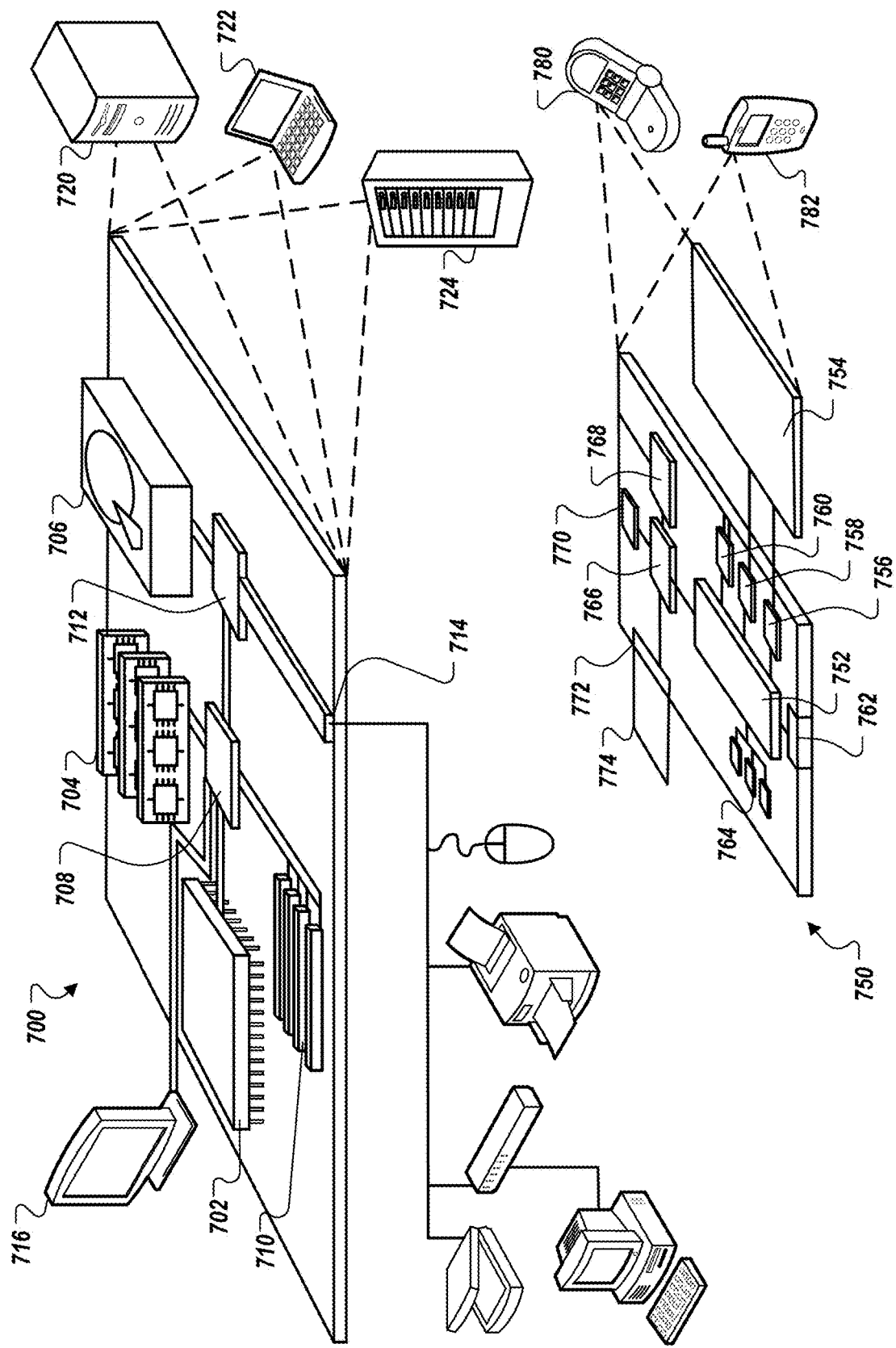
FIG. 7 is an example of a computing device and a mobile computing device that may be used to implement the computer-implemented methods and other techniques described herein.

Each of the content distribution system 108, content database 110, and converter system 112 may generally be implemented as a combination of hardware and software of one or more computers in one or more locations, such as computers described with respect to FIG. 7. Each of the content distribution system 108, content database 110, and converter system 112 may include a respective network interface to enable network communications.

In some implementations, a client device 106 submits a request for content over a network. The user 104 of the client device 106 may be browsing for content, such as HTML pages, electronic documents, image files, video files, and audio files, in a web browser on the client device 106. For example, a requested web page may include particular HTML content that is requested from the content distribution system 108. Alternatively, the user 104 may be using a native application (e.g., a video game or a news application) running on the client device 106. For example, content may be rendered inside a webview (i.e., a small window) inside of the application.

The content distribution system 108 may receive the request for content and identify autoplay content to provide to the client device 106 in response to the request. The content distribution system 108 may identify the autoplay content from various content stored in the content database 110. In some content distribution environments, after the content distribution system 108 identifies the autoplay content to provide to the client device 106, the content distribution system 108 serves the entire autoplay content to the client device 106 for loading and displaying on the content device, for example, in a web browser or media player executing at the client device 106.

In the example environment 100 shown in FIG. 1, the content distribution system 108 makes a determination whether to serve the identified autoplay content or click-to-play content that was generated from the identified autoplay content. This generated click-to-play content is sometimes referred to herein as converted content in contrast to the original content provided by a content provider. As referred to herein, the phrase "animated content" refers to the audio-visual content that is played when either of the autoplay or a corresponding click-to-play content is played at the user device.

Figure 2:
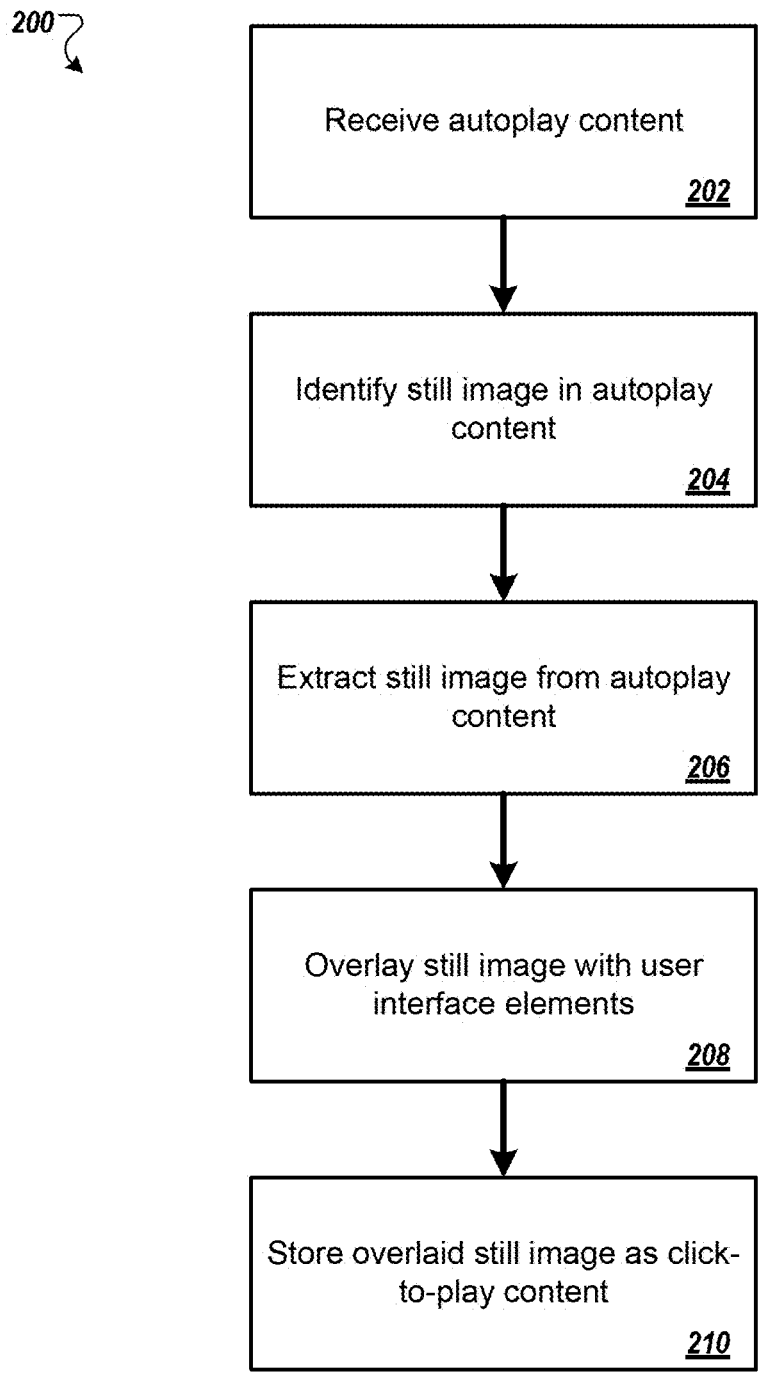
FIG. 2 is a flow chart of an example process for processing autoplay content.

FIG. 2 is a flow chart of an example process 200 for generating click-to-play content. Each of the steps in the process 200 may be performed by a combination of the content database 110 or the converter system 112.

At 202, the content database 110 receives content, including autoplay content, from one or more content providers 114. The content may be in the form of a compressed file containing various assets (e.g., HTML content, Javascript®, image files, video files, etc.). The content database 110 then decompresses content. The content database 110 is generally responsible for storing indexed content that has been made available for distribution. An autoplay content item may be, for example, a video clip that begins playback when the video clip has partially or fully loaded in a browser or media player. The autoplay content may include an actual digitized video itself and pertinent metadata about the digitized video. The content database 110 may include an index of all content, including a title, a short textual description, and a creator ID for a given content item.

In some implementations, the environment includes a content management system that permits content providers 114 to define selection rules for serving their content. The selection rules may take into account characteristics of a particular video viewer or a particular requesting device to provide relevant content to the viewer or device. Example selection rules include keywords that contribute (or control) distribution of content when words or phrases matching the keywords are present in either search queries, videos, or video content metadata. Content items that are associated with keywords matching a phrase included in a content request can be selected for display in content slots associated with video content. For example, content may be presented in a banner format near a video playing on a user's device or over a portion of the video playing on the user's device.

At 204, the converter system 112 accesses autoplay content in the content database and identifies a still image (e.g., a single frame) in the autoplay content. For example, the still image may be a screenshot from a video clip. The still image, or screenshot, is used as a preview of the content item in a generated click-to-play content item. In this way, a user can view the still image to get an idea of what the full animation (e.g., video clip) associated with the click-to-play content item is. Various implementations may utilize different processes for selecting the still image. For example, some processes use the first frame of an animation (e.g., video clip) as the still image. However, in some situations, frames other than the first frame of the animation (e.g., video clip) may provide more useful and relevant information about the animation (e.g., video clip).

There are several approaches for generating the still image. In one implementation, the converter system 112 generates a still image after running the autoplay content for a short period of time. In an alternate implementation, the converter system 112 generates a still image of the very first rendered frame of the animated content. This creates the effect of continuity once the content is played back because the user is first presented with the very first rendered frame as a still image and subsequently presented with playback of the animated content with more seamless transition from still image to animated content. In yet another implementation, the converter system 112 generates a screenshot of the animated content after the animated content has played for 30 seconds (or some other specified amount of time). The still image may be extracted without playback of the animated content. For example, the converter system 112 may select a particular time or location for the still image (e.g., first frame, middle frame, last frame). As will be described further below, in some implementations, the converter system 112 extracts more than a still image. In those cases, the converter system 112 may extract all static content (or a snippet of multiple successive frames) from the autoplay content.

At 206, the converter system 112 extracts the still image from the autoplay content. The converter system 112 may use various techniques to extract a still image. For example, the converter system 112 may use optical character recognition (OCR) to find the most information dense frame to be used as a still image. In some implementations, the converter system 112 analyzes the compressibility of edges of frames for extracting a still image. In some implementations, the extracted content is not necessarily a still image but can other forms of data. For example, extracted content may be in the form of a portable network graphics (PNG) file, a JPEG file, or HTML content.

In one example, the content database 110 may transmit to the converter system 112 autoplay content that it received from a content provider 114. The converter system 112 may comprise a server running a headless browser (i.e., a version of the browser that is running on a server). The headless browser then loads the autoplay content (including video content and any HTML or Javascript®) and plays back the content for a period of time (e.g., 30 seconds) and then generates a still image from the content (e.g., at 30 seconds). The still image may be a PNG or JPEG file that represents a status of the content (e.g., at 30 seconds). In some alternate implementations, rather than extracting a static image (e.g., still image) from the autoplay content, the converter system 112 generates a static HTML from the autoplay content. The static HTML links to the same resources as the autoplay content (and additional HTML or Javascript® that causes animation), but rather than having to run complicated code (e.g., Javascript®), only static code is included in the generated content. For example, if the original content included both an image and overlaid interactive text (e.g., hyperlinks), the generated static HTML content would include both the image and also the overlaid interactive text. In contrast, where only a still image is extracted from a video, the overlaid interactive text (e.g., hyperlinks) would be lost. This approach may be especially beneficial where a static image is of low quality and/or low resolution. For example, a low quality screen shot having text relating to a content provider's web page may be difficult to read, so it may be more beneficial to provide static HTML content for a better user experience. Additionally, this approach may be beneficial where a user views the static HTML content and wishes to view the associated animation. In these scenarios, after a user expressed a desire to view the animating content (e.g., by clicking on a play button), only the non-static content would need to be provided to the user's computing device at that time in order for the user to view the animating content because all of the static content was already provided by the content server.

At 208, the converter system 112 overlays the extracted still image with one or more user interface elements. The one or more user interface elements may include, for example, a play button or a button for accessing a landing page associated with the autoplay content (e.g., an advertiser or video creator website). For example, if the autoplay content is a video, the still image may be overlaid with a play button to cause the video to begin playback and a button for navigating to the landing page associated with the video. In browser-based content converters, a user would be required to click on a content two times—a first time to start playback and a second time to visit the landing page—in order to navigate to the landing page. The multiple user interface elements, including a button for navigating to the landing page—allow a user to visit the landing page with a single click. In the example involving video, this helps to improve conversion statistics because a user need only click on the content a single time. In earlier approaches requiring two clicks, a user may click on the video a single time, but he or she may become distracted before clicking on the video a second time and never visit a landing page for the video. From the perspective of a content provider, this presents a negative experience because it takes more effort by the user to visit the content provider's website.

In some implementations, overlaying the extracted still image may include using a predefined template. For example, the converter system 112 may store a plurality of templates that each define a layout of user interface elements and/or relative positions of user interface elements. In some example templates, a play button may be included in the middle of the overlay, while in other example templates, a play button may be included at a periphery of the overlay so as to be less intrusive. In some implementations, a template may define at least one of a level of grayscale or level of opacity. For example, when the extracted still image is overlaid with one or more user interface elements, the still image itself may change in appearance. In some implementations, the still image is displayed in black and white (e.g., grayscale) while user interface elements are shown in color. In alternate implementations, the still image is shown in color while the user interface elements are overlaid on the still image causing the still image to appear darker due to a higher level of opacity of a template overlay. In some implementations, multiple templates are used to generate multiple version of generated content. In this way, the content distribution system 108 can select from multiple versions of converted content to serve to a remote client device 106. Code for an example HTML template is shown below:

```
<!DOCTYPE html>
<html>
```

```
<head>
    // Load minimal ad related scripts.
</head>
<body>
    <div id="root_template_div" style="position:absolute;overflow:hidden;">
        <iframe id="main-content" src="about:blank" width="300" height="250"></iframe>
        <img id='preview' src='preview-3.jpg' style='position:absolute;left:0px;top:0px'></img>
        <div id-'link' style-'position:absolute;left:4px;bottom:4px;color:white;cursor:pointer;'>
            <a onclick='goToLanding( )' style='font-family: sans-serif;'>Visit advertisers website <img src-'callout.svg' style='width:12px'></img></a>
        </div>
    </div>
    <script>
        var divElement = document.getElementById('preview');
        divElement.onclick = function( ) {
            // load main content into "main-content" div.
            document.getElementById('preview').style.display = 'none';
        };
        var goToLanding = function( ) {
            // Trigger ad click event.
        }
    </script>
</body>
</html>
```

In some implementations, various versions of converted content are generated by the converter system 112, and the content distribution system 108 can select an appropriate version of the converted content based on the content request and/or device characteristics of the requesting device (e.g., the type of device, the resolution of the device, the connection speed, etc.).

This step 208 introduces new ways for a user to interact with the content. In contrast to browser-based content blockers, a user may be able to cause playback of blocked content. However, step 208 allows various other user interface elements to be overlaid on the still image, such as a button that allows a user to navigate to a content provider's website without having to first playback the content, or a button that allows the user to view other content, some of which may be related in subject matter to the original content.

At 210, the converter system 112 stores the overlaid still image as part of the click-to-play content. In some implementations, the converter system 112 stores the click-to-play content in association with the autoplay content from which the click-to-play content is generated. In some implementations, the converter system 112 transmits the click-to-play content to the content database 110 where the converted content is stored with the original content.

In some implementations, one or more of steps 202-210 may be performed by a different combination of the content database 110, the converter system 112, and the content distribution system 108. For example, in some implementations, the content database 110 first receives the autoplay content from a content provider 114. Then, the content database 110 sends the autoplay content to the converter system 112 for converting the autoplay content to click-to-play content. The converter system 112 receives the autoplay content, identifies a relevant still image in the autoplay content at 204, extracts the still image from the autoplay content 206, and overlays the still image with one or more user interface elements 208. At 210, the content database stores the stores the overlaid still image as click-to-play content. The click-to-play content may be stored in association with the autoplay content from which the click-to-play content was generated.

In some implementations, the converter system 112 performs a batch conversion of multiple autoplay content items to generate multiple click-to-play content items at one time. In some implementations, the converter system 112 extracts static HTML content (e.g., a still image) from an autoplay content item but does not select a template and/or one or more user interface elements. Rather, the content distribution system 108 requests a particular template and/or one or more user interface elements at run time if the content distribution system 108 elects to provide the static HTML content rather than an autoplay content item to a requesting remote client device. At run time, the content distribution system 108 then obtains the converted content (e.g., the static HTML content) from the content database 110 and selects a particular template and/or one or more user interface elements for rendering on the remote client device. In these implementations, one or more of these tasks may be performed by a rendering server.

As discussed above, in some implementations, the converter system 112 generates click-to-play content from the autoplay content. In some implementations, the converter system 112 specifically identifies autoplay content items stored in the content database 110 as candidates to be converted to click-to-play content items. That is, content providers 114 can provide many types of content to the content database 110. In some cases, the content can cause bad user experiences and/or the content can load too slowly. In many cases, the content providers do not intend to cause a negative experience, so the systems and methods described herein can improve the content presentation and user experience by reducing the load latency for content provided by content providers. Content that causes the negative user experiences includes at least some autoplay content. However, in some situations, it may be that not all HTML autoplay content causes the negative user experiences. Therefore, in some implementations, the converter system 112 determines which autoplay content may cause a negative user experience and generates click-to-play content from only the autoplay content that is determined to contribute to a negative user experience (e.g., due to long load times).

Figure 3:
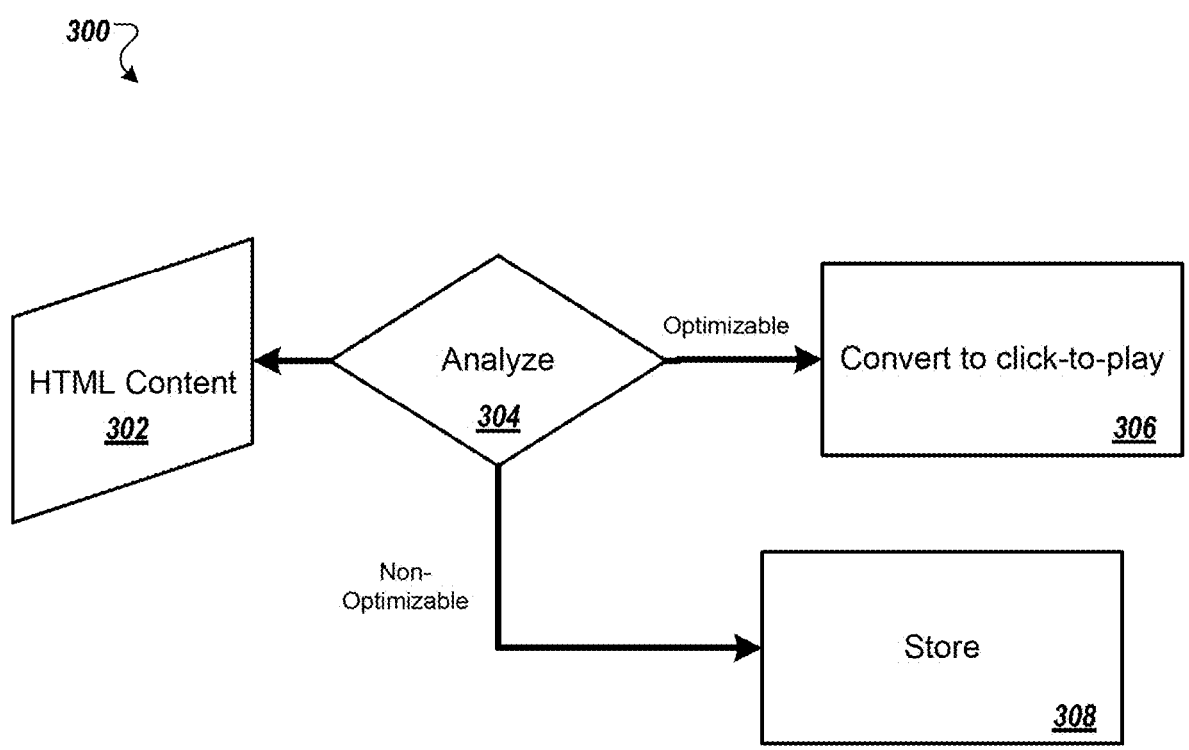
FIG. 3 is a flow chart of an example process for converting HTML content to click-to-play content.

FIG. 3 is a flow chart of an example process for converting HTML content to click-to-play content. Note that in environments where the content database 110 performs the conversion, each of the processes in FIG. 3 would be performed by the content database 110. In the process, HTML content is analyzed 304 to determine whether the content should be converted to click-to-play content 306. If the converter system 112 determines that a particular HTML content is non-optimizable then no additional content is generated. If the converter system 112 determines that a particular HTML content 302 is optimizable, however, the converter system 112 converts the HTML content 302 to click-to-play content 306. The content is then stored at 308. Optimizable content may refer to content than can be converted or content that would benefit from conversion, while non-optimizable content may refer to content that cannot be converted or content that does not benefit from conversion.

Non-optimizable content may include, for example, pure static content or mostly static content (e.g., HTML content that does not comprise any animating content). Optimizable content may include, for example, HTML autoplay content or HTML content that uses JS libraries to perform heavy graphic animations. In some implementations, HTML autoplay content is not necessarily considered optimizable. Rather, the converter system 112 determines a size of the HTML autoplay content, and if the size is greater than a threshold size, then the HTML autoplay content is considered optimizable and converted to click-to-play content 306. In some implementations, analyzing 304 content to determine whether content is optimizable or non-optimizable includes determining whether the content 302 includes any animations or excessive animations (e.g., more than a threshold animation duration). In some implementations, analyzing 304 content to determine whether content 302 is optimizable or non-optimizable includes determining whether the content 302 will cause greater than a threshold amount of time to load on a client device (e.g., based on network speed, client device processing capabilities, or client device storage capabilities). That is, if the converter system 112 determines that the content will load too slowly on the client device (e.g., will take longer than a specified amount of time to load), the content is deemed optimizable and converted to static content.

When either the content database 110 or the converter system 112 analyzes HTML content 302 and determines that the content should be converted to click-to-play content, the respective server then generates click-to-play content from the HTML content. For purposes of discussion, the processes for generating the click-to-play content will be described below with respect to the converter system 112, though it should be noted that in some implementations, the content distribution system 108 content database 110 can also perform these processes. To generate click-to-play content, the converter system 112 identifies a screenshot, or still image, from the autoplay content item, to be used as a still image for the click-to-play content item. Several approaches may be used to generate the still image. In some implementations, the converter system 112 generates a still image after running the autoplay content for a short period of time. In some implementations, the converter system 112 generates a still image at the very first rendered frame to create the effect of continuity once the content is played back, or animated. This approach, however, may result in a still image that provides less relevant information relating to the autoplay content item. For example, if the autoplay content item begins with a black screen, then the extracted still image would be a black screen that ultimately would not show any useful information about the autoplay content item. In some implementations, the converter system 112 generates a still image after playing the autoplay content item for a set period of time (e.g., 30 seconds) after which point the autoplay content item is no longer animating. This approach has the advantage of providing a frame that includes more relevant information about the autoplay content item.

After the converter system 112 extracts a still image, it provides one or more user interface elements for playback of the autoplay content. Typically, the user interface elements are overlaid on the still image so that the user is shown a relevant frame from the click-to-play content and provided a mechanism by which the user can cause the animation associated with the click-to-play content animate. This provides information about the animated content to the user while not using bandwidth to download the animated content or distracting a user who does not wish to view the animated content. However, if a user does wish to view the animated content, the user interface elements provide the user a clear way of viewing the animated content.

In some implementations, the converter system 112 selects a particular autoplay content item to convert because that content item causes poor performance by a computing device. For example, a converter system 112 select an autoplay content that typically begins to animate after 30 seconds on a particular computing device. In this example, while the savings in the amount of data that is downloaded to the computing device may be negligible, the benefits to the browsing experience and the battery life of the particular computing device may be substantial. When the content item is converted from an autoplay content item to a click-to-play content item, there is some cost to the browser to download the click-to-play content—similar to downloading an image—but the content item does not disrupt the rendering of other content on the computing device unless or until a user clicks to view the animation associated with the click-to-play content.

Example code for converting autoplay content to click-to-play content is presented below:

```
<!DOCTYPE html>
<html>
<head>
    // Load minimal ad related scripts.
    @keyframes background-fade-in {
        from {opacity: 0;}
        to {opacity: 1;}
    }
    @keyframes title-slide-in {
        from {top: -100px;}
        to {top: 200px;}
    }
```

```
      </head>
      <body>
         <div id="root_template_div" style="position:absolute;overflow:hidden;">
            <iframe id="main-content" src="about:blank" width="300" height="250"></iframe>
            <div id='preview' style='position:absolute;left:0px;top:0px;width:300px;height:250px'>
               <img src="background.jpg" style='animation-name:background-fade-in;animation-duration:5s'></img>
               <div id='title' style='animation-name:title-slide-in;animation-duration:5s'></div>
               <div id='more_info'></div>
            </div>
            <div id='link' style='position:absolute;left:4px;bottom:4px;color:white;cursor:pointer;'>
               <a onclick='goToLanding( )' style='font-family: sans-serif;'>Visit advertisers website <img src='callout.svg' style='width:12px'></img></a>
            </div>
         </div>
         <script>
            var divElement = document.getElementById('preview');
            divElement.onclick = function( ) {
               // load main content into "main-content" div.
               document.getElementById('preview').style.display = 'none';
            };
            var goToLanding = function( ) {
               // Trigger ad click event.
            }
         </script>
      </body>
   </html>
```

In some implementations, the converter system 112 selects particular content to convert because the particular content causes latency issues. In some instances, the latency issues are caused by a combination of the particular content item and particular characteristics of a computing device or particular operating system. Converting HTML autoplay content to click-to-play content provides better interactions in these instances, as shown below in FIG. 4.

Figure 4:
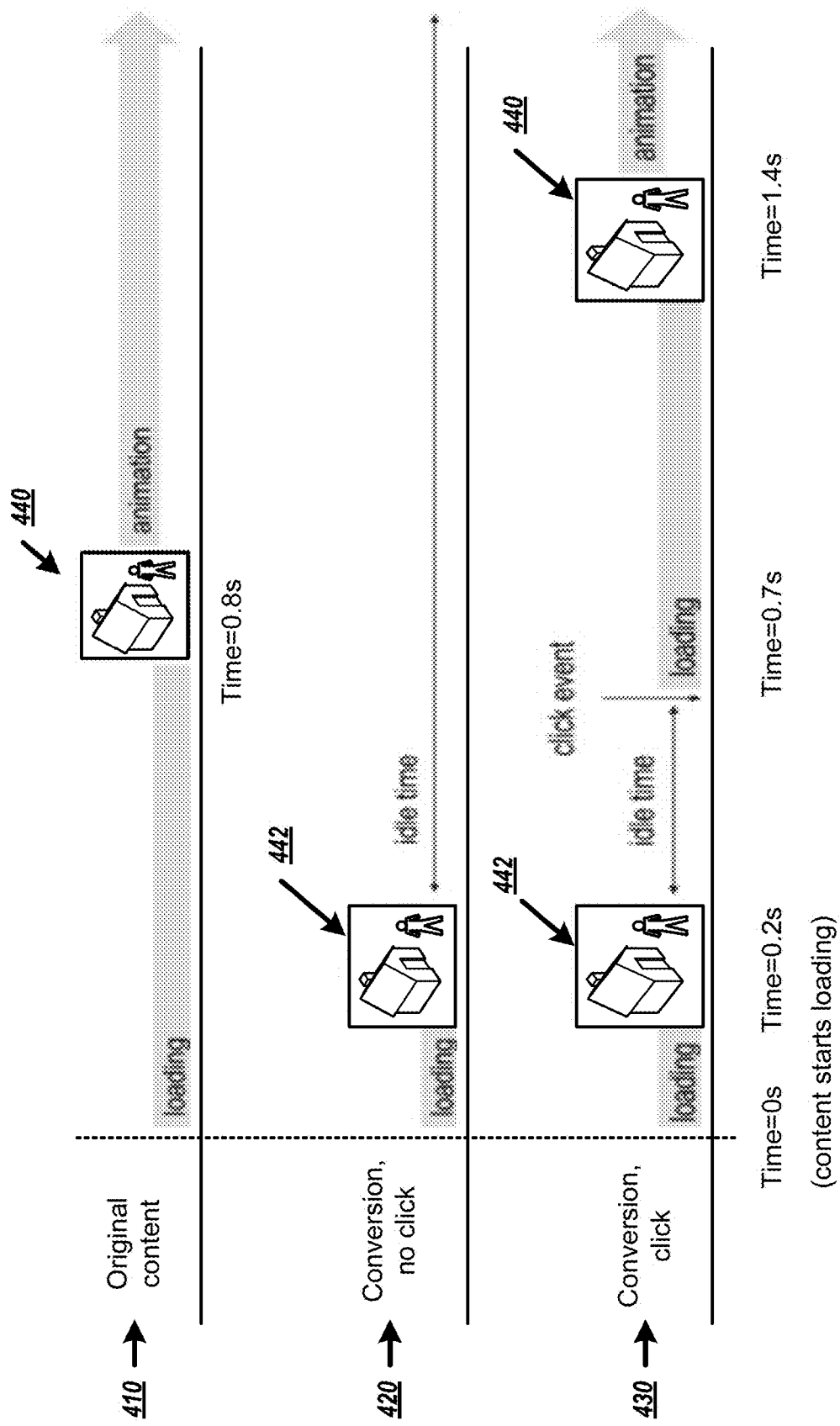
FIG. 4 illustrates latencies for serving autoplay and click-to-play content.

One of the advantages of the techniques discussed herein is that content with high loading latency can be replaced by click-to-play content that loads quickly on a browser, for example, in the time it would take to load an image. FIG. 4 illustrates how these techniques can reduce lag time and/or preempt the downloading of unwanted content. Timeline 410 shows a scenario where original HTML autoplay content including animation is presented to a user. In these scenarios, where HTML autoplay content is provided to a user, the animating content begins loading automatically. As shown in 410, original content begins loading at time=0 s, but animation 440 is not begin playback until time=0.8 s. Thus, there is significant lag following the start of content loading and content playback. Additionally, in this scenario, if the user did not wish to video the playback content at all and immediately stopped playback of the HTML autoplay content, unnecessary resources were consumed. That is, each HTML autoplay content that a uses stops playback of consumes CPU cycles at the content distribution system, consumes network bandwidth, and contributes to battery drain on the user's device because the user's device downloads unwanted content and the user watches portions of animated content in which the user is not interested.

Timeline 420 shows a scenario where original HTML autoplay content including animation has been converted to click-to-play content 442, and the click-to-play content 442 is presented to a user. In this scenario, the user does not interact with the click-to-play content 442 (e.g., by clicking on the content to cause it to animate) after the click-to-play content 442 has loaded. The click-to-play content 442 begins loading at time=0 s, and is presented to the user at time=0.2 s. Thus, by comparing timeline 410 to timeline 420, the HTML content 440 takes 0.6 s longer to load than the click-to-play content 442, resulting in a significant lag. In timeline 420, because the user does not click on the click-to-play content, no further content loads.

Timeline 430 shows a scenario where original HTML autoplay content including animation has been converted to click-to-play content 442, the click-to-play content 442 is presented to a user, and the user clicks on the click-to-play content 442 in order to view the HTML content 440. As with timeline 420, in timeline 430, the click-to-play content 442 begins loading at time=0 s, and is presented to the user at time=0.2 s. The system then idles the click event at time=0.7 s when the user clicks on the play button of the click-to-play content 442. The HTML content 440 then begins loading at time=0.7 s and begins playback at time=1.4 s.

There are several advantages to the example timelines 410, 420, 430 shown in FIG. 4. First, the click-to-play content loads faster than the animating content. Next, by not automatically loading the animating content that can cause latency issues, the browser has freed up resources to perform other operations or download other content. Additionally, click-to-play content consumes no user resources after loading (as shown in timeline 420), unless the user further engages the content, such as, for example, by clicking on the content (as shown in timeline 430).

In some implementations, while the click-to-play content 442 is being displayed, the HTML content 440 may be downloading on the client device. This has the advantage that the click-to-play content 442 acts as a preview for the user while the HTML content 440 is being loaded. Then, when the user clicks a user interface element to play the HTML content, the HTML content animation 440 displays in a more seamless manner because the content 440 has already been downloaded. In other implementations, the HTML content 440 is not downloaded until the user indicates that he or she wishes to view the animation by, for example, clicking on a user interface element (e.g., a play button) associated with the click-to-play content. This has the advantage that non-played content will load quickly and not use any unnecessary resources. However, the experience of clicking on a user interface element may result in slower playback of the HTML content 440 because the browser does not cause the HTML content 440 to be downloaded without user input and must download the HTML content 440 and other resources to start playback.

In some implementations, the converter system 112 can generate the still image or preview using actual resources and HTML code related to the content. This provides the advantage of preloading some of the resources needed for playback of the actual content animation.

Figure 5A:
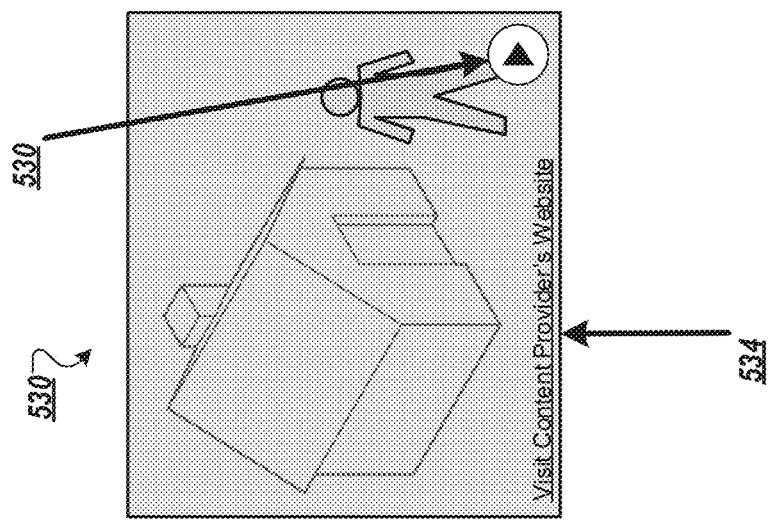
FIGS. 5A-C are example click-to-play content representations.
Figure 5B:
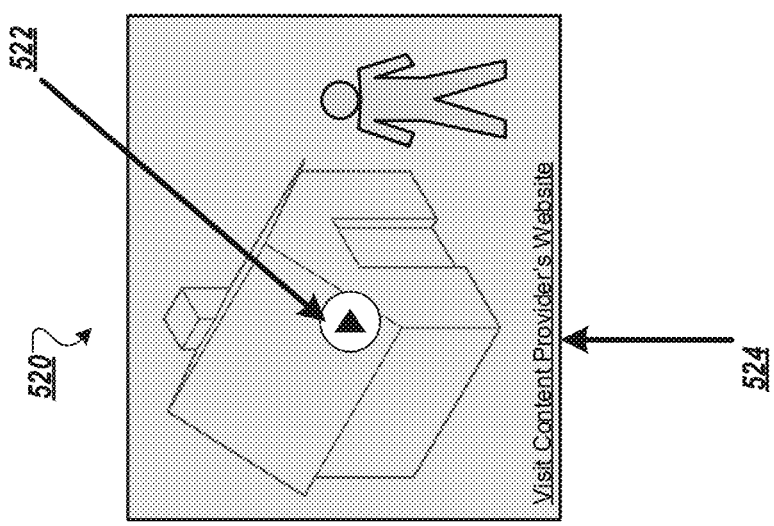
Figure 5C:
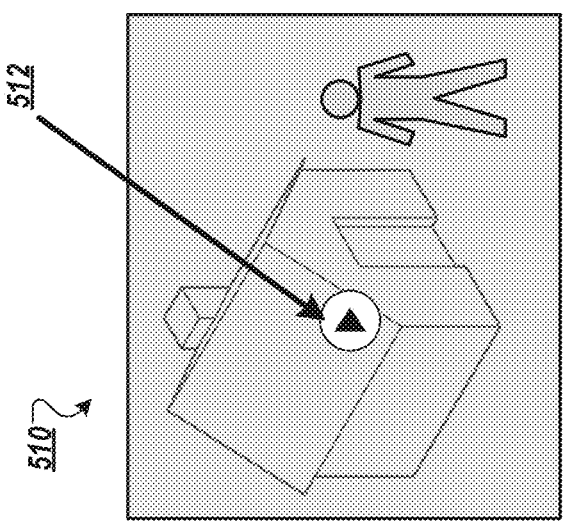

FIGS. 5A-C show various examples of screenshots with user interface elements. In a basic approach, shown in FIG. 5A, animating content has been converted to click-to-play content that displays a screenshot 510 and a play button 512 that overlays the screenshot 510. If a user wishes to view the animating content associated with the click-to-play content, the user selects the play button 512, which causes the browser to request the HTML autoplay content associated with the click-to-play content and that includes the animating content. The browser receives the HTML autoplay content and the animating content begins to animate. In some implementations, if the user clicks on the content a second time, a target website associated with the content will load (e.g., the user will be redirected to the target website).

Another approach is shown in FIG. 5B, where click-to-play content is displayed as a screenshot 520 and an overlaid play button 522 together with a button for visiting the content provider's website ("Visit content provider's website") 524. In this example, if a user clicks the play button 522, the content will begin to animate in a manner similar to FIG. 5A. That is, if the user selects the play button 522, the browser requests, from a content distribution system, the HTML autoplay content associated with the click-to-play content and that includes the animating content. The browser then receives the HTML autoplay content and the animating content begins to animate. However, if the user does not wish to watch the animation but wants to visit the content provider's website, the user need only click on the content a single time—e.g., by clicking the "Visit content provider's website" button 524—to be redirected to the target website. That is, a user is not required to first click to play before clicking to visit the target website.

FIG. 5C shows an alternate approach having a screenshot 530 in which the play button 532 and button for visiting the content provider's website 534 are less intrusive. In particular, the play button 532 is placed at the corner of the screenshot 530 rather than in the middle of the screenshot.

Figure 6:
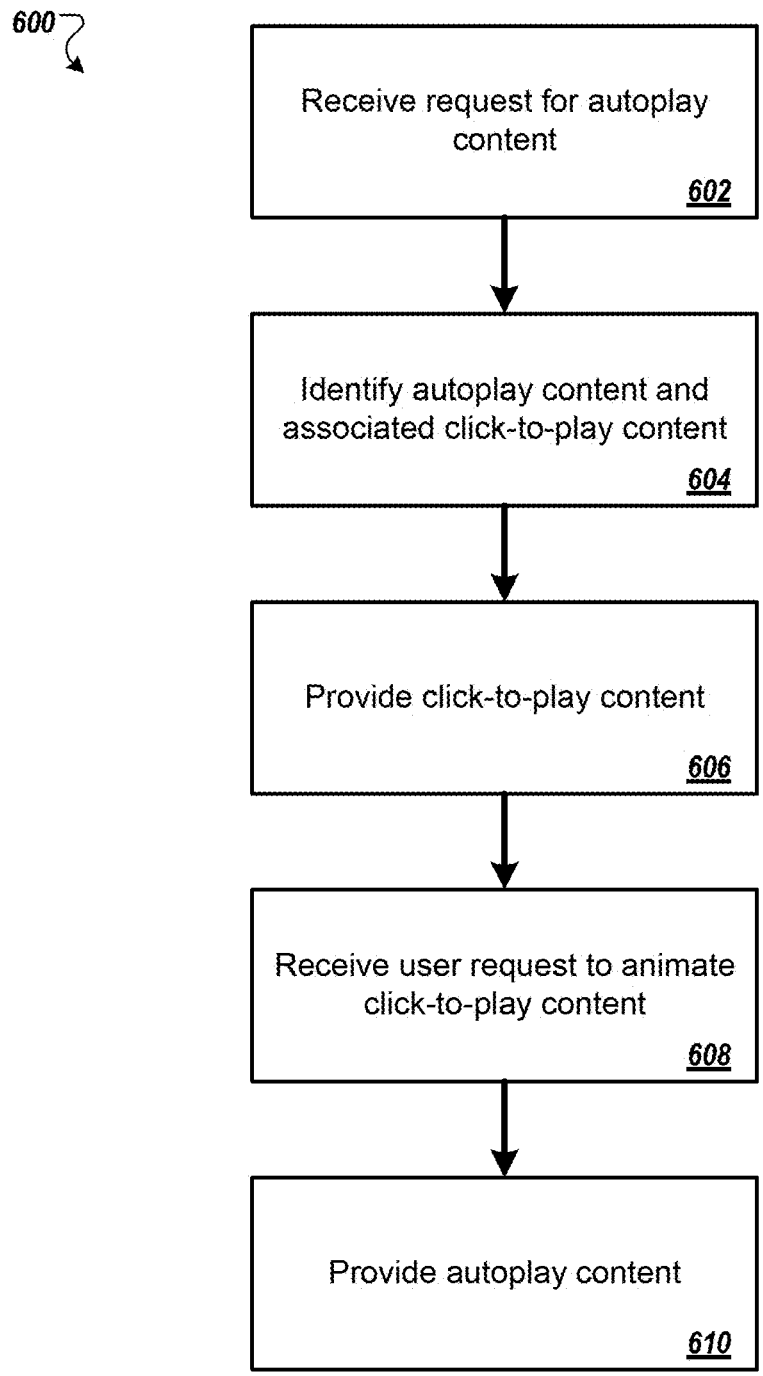
FIG. 6 is a flow chart of an example process for serving click-to-play content and autoplay content.

FIG. 6 is flow chart of an example process 600 for serving click-to-play content and autoplay content. The steps in the example process 600 may occur after process 200 in FIG. 2 where click-to-play content has been generated from autoplay content. At 602, content distribution system 108 receives, from a remote client device, a request for content. The requested content may include HTML content, which may include HTML autoplay content. At 604, in response to the request for content, the content distribution system 108 identifies an HTML content item from a plurality of HTML content items stored on the content database 110. The HTML content is original content in that it is not converted click-to-play content but rather, for example, autoplay content that a content provider 114 generated and sent to the content database 110.

At 604, the content distribution system 108 receives, from the content database 110, a click-to-play content item associated with the HTML content item. The click-to-play content item is generated from the HTML content item, for example, in the process 200 of FIG. 2.

At 606, the content distribution system 108 provides, to the remote client device, the click-to-play content item associated with the HTML content item. The provided click-to-play content item may resemble, for example, any of the exemplary click-to-play content items shown in FIGS. 5A-C. As shown in timeline 430 of FIG. 4, the click-to-play content item 442 may begin loading at time=0 s and be displayed at time=0.2 s. At time=0.2 s, the remote client device begins to idle, pending further user input. In some implementations, the click-to-play content is provided to a web browser or a native application of the remote client device.

At 608, the content distribution system 108 receives a user request to view animation related to the click-to-play content. Referring again to timeline 430 of FIG. 4, at time=0.7 s, the content distribution system 108 recognizes a click event. The content distribution system 108 then retrieves the HTML content associated with the click-to-play content from the content database 110.

At 610, the content distribution system 108 provides the HTML autoplay content associated with the click-to-play content to the client device. Referring again to timeline 430 of FIG. 4, at time=0.7 s, the content distribution system 108 recognizes a click event and begins transmitting the HTML content 440. At time=1.4 s, the remote client device has finished loading the HTML content 440, and the HTML content 440 begins playback of the animation.

In some implementations, after the content distribution system 108 identifies an HTML content item from a plurality of HTML content items stored on the content database 110, the content distribution system 108 makes a determination as to whether to provide to the remote client device the HTML content item or a click-to-play content associated with the HTML content. This determination may include determining a file size of the HTML content and a file size of the click-to-play content. Then, based on a comparison of the file size of the HTML content and the click-to-play content with a threshold file size, the content distribution system 108 decides which content to serve. For example, both the HTML content and the click-to-play content are smaller than the threshold file size, the content distribution system 108 may select the HTML content to serve. However, if the HTML content is larger than the threshold file size and the click-to-play content is smaller than the threshold file size, then the content distribution system 108 may select the click-to-play content to serve to the remote client device. In some implementations, the content distribution system 108 makes a determination regarding an amount of lag associated with loading the HTML content when selecting whether to serve the HTML content or the click-to-play content. This determination regarding lag may be based on the HTML content itself, the connection speed of the remote client device, and/or device features of the remote client device.

FIG. 7 shows an example of a computing device 700 and a mobile computing device that may be used to implement the computer-implemented methods and other techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 770. It may also be implemented as part of a smart-phone 772, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content distribution system that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content distribution system.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A computer-implemented method comprising:
receiving, by a content database and from a content provider, a particular original content item comprising animated content that automatically plays when provided to a client device;
generating, by one or more processors, a plurality of converted content items from a plurality of original content items that includes the particular original content item comprising the animated content, the generating comprising:
for the particular original content item, selecting, from multiple frames of the animated content of the particular original content item, a static representation image; and
creating a particular converted content item that only plays the animated content of the particular original content item when a particular user interface element is interacted with, the creating including overlaying the static representation image with the particular user interface element that initiates playback of the particular converted content item in response to interaction with the particular user interface element;
identifying multiple different opportunities to distribute the particular original content item to different client devices;
providing the particular converted content item to a first portion of the different client devices; and
providing the particular original content item to a second portion of the different client devices.

2. The computer-implemented method of claim 1, further comprising:
receiving, by the content database and from the different client devices, one or more user requests to view content items comprising animated content related to the particular converted content item that was generated by the one or more processors; and
in response to receiving the user request to view animated content, providing, to the client device, the particular original content item.

3. The computer-implemented method of claim 1, wherein the plurality of original content items comprise autoplay HTML, content and the plurality of converted content items comprise click-to-play content.

4. The computer-implemented method of claim 1, further comprising:
analyzing the plurality of original content items in the content database; and
identifying original content items that are eligible for conversion.

5. The computer-implemented method of claim 4, wherein identifying original content items that are eligible for conversion comprises identifying, as the original content items that are eligible for conversion, original content items that are larger than a threshold file size.

6. The computer-implemented method of claim 1, wherein the particular converted content item has a smaller file size than the particular original content item.

7. The computer-implemented method of claim 1, wherein the content database stores each of the plurality of converted content items in association with a corresponding animated original content item.

8. The computer-implemented method of claim 1, further comprising determining whether to provide to the client device the particular original content item or the particular converted content item, wherein the determining comprises:
determining a file size of the particular original content item and a file size of the particular converted content item; and
based on a comparison of the file size of the particular original content item and the file size of the particular converted content item with a threshold file size, selecting the particular converted content item.

9. A system comprising:
a content database, in communication with one or more content providers, that receives, from the one or more content providers, a particular original content item comprising animated content that automatically plays when provided to a client device; and
one or more processors that are configured to perform operations comprising:
generate a plurality of converted content items from a plurality of original content items that includes the particular original content item comprising the animated content, the generating comprising:
for the particular original content item, select, from multiple frames of the animated content of the particular original content item, a static representation image; and
create a particular converted content item that only plays the animated content of the particular original content item when a particular user interface element is interacted with, the creating including overlaying the static representation image with the particular user interface element that initiates playback of the particular converted content item in response to interaction with the particular user interface element;
identify multiple different opportunities to distribute the particular original content item to different client devices;
provide the particular converted content item to a first portion of the different client devices; and
provide the particular original content item to a second portion of the different client devices.

10. The system of claim 9, wherein the content database receives, from the different client devices, one or more user requests to view content items comprising animated content related to the particular converted content item that was generated by the one or more processors; and
in response to receiving the user request to view animated content, the one or more processors provide to the client device, the particular original content item.

11. The system of claim 9, wherein the plurality of original content items comprise autoplay HTML content and the plurality of converted content items comprise click-to-play content.

12. The system of claim 9, wherein the one or more processors analyze the plurality of original content items in the content database and identifies original content items that are eligible for conversion.

13. The system of claim 12, wherein identifying original content items that are eligible for conversion comprises identifying, as the original content items that are eligible for conversion, original content items that are larger than a threshold file size.

14. The system of claim 9, wherein the particular converted content item has a smaller file size than the particular original content item.

15. One or more non-transitory computer-readable media having instructions stored thereon that, when executed by one or more processors, cause performance of operations comprising:
receiving, by a content database and from a content provider, a particular original content item comprising animated content that automatically plays when provided to a client device;
generating, by one or more processors, a plurality of converted content items from a plurality of original content items that includes the particular original content item comprising the animated content, the generating comprising:
for the particular original content item, selecting, from multiple frames of the animated content of the particular original content item, a static representation image; and
creating a particular converted content item that only plays the animated content of the particular original content item when a particular user interface element is interacted with, the creating including overlaying the static representation image with the particular user interface element that initiates playback of the particular converted content item in response to interaction with the particular user interface element;
identifying multiple different opportunities to distribute the original content item to different client devices;
providing the particular converted content item to a first portion of the different client devices; and
providing the particular original content item to a second portion of the different client devices.

16. The one or more non-transitory computer-readable media of claim 15, the operations further comprising:
receiving, by the content database and from the different client devices, one or more user requests to view content items comprising animated content related to the particular converted content item that was generated by the one or more processors; and
in response to receiving the user request to view animated content, providing, to the client device, the particular original content item.

17. The one or more non-transitory computer-readable media of claim 15, wherein the plurality of original content items comprise autoplay HTML content and the plurality of converted content items comprise click-to-play content.

18. The one or more non-transitory computer-readable media of claim 15, wherein the operations comprise:
analyzing the plurality of original content items in the content database; and
identifying original content items that are eligible for conversion.

19. The one or more non-transitory computer-readable media of claim 18, wherein identifying original content items that are eligible for conversion comprises identifying, as the original content items that are eligible for conversion, original content items that are larger than a threshold file size.

20. The one or more non-transitory computer-readable media of claim 15, wherein the particular converted content item has a smaller file size than the particular original content item.

* * * * *